United States Patent
Sumioka et al.

(10) Patent No.: US 8,927,173 B2
(45) Date of Patent: Jan. 6, 2015

(54) POROUS ELECTRODE SUBSTRATE, METHOD FOR PRODUCING THE SAME, MEMBRANE ELECTRODE ASSEMBLY, AND POLYMER ELECTROLYTE FUEL CELL

(71) Applicant: Mitsubishi Rayon Co., Ltd.

(72) Inventors: Kazuhiro Sumioka, Toyohashi (JP); Yoshihiro Sako, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 13/892,561

(22) Filed: May 13, 2013

(65) Prior Publication Data

US 2013/0273454 A1    Oct. 17, 2013

Related U.S. Application Data

(62) Division of application No. 13/147,814, filed on Aug. 4, 2011.

(30) Foreign Application Priority Data

Feb. 4, 2009   (JP) ................. 2009-023890

(51) Int. Cl.
  *H01M 4/96*   (2006.01)
  *H01M 4/86*   (2006.01)
  (Continued)

(52) U.S. Cl.
  CPC ........... *H01M 4/8065* (2013.01); *D04H 1/4242* (2013.01); *D04H 1/4382* (2013.01); *D21H 13/50* (2013.01); *H01B 1/122* (2013.01); *H01M 4/926* (2013.01); *H01M 8/0234* (2013.01); *H01M 8/1002* (2013.01); *D21H 15/02* (2013.01); *Y02E 60/521* (2013.01)
  USPC .......................................... 429/480; 429/534

(58) Field of Classification Search
  USPC .......................................... 429/480, 523, 534
  See application file for complete search history.

(56) References Cited

U.S. PATENT DOCUMENTS

2002/0175073 A1*   11/2002   Nakamura et al. ............ 204/294
2005/0100498 A1   5/2005   Nakamura et al.
(Continued)

FOREIGN PATENT DOCUMENTS

| EP | 1788651 A1 | 5/2007 |
| EP | 1942536 A1 | 7/2008 |

(Continued)

OTHER PUBLICATIONS

International Search Report issued Apr. 27, 2010 in PCT/JP10/051380 filed Feb. 2, 2010.

(Continued)

*Primary Examiner* — Gregg Cantelmo
(74) *Attorney, Agent, or Firm* — Oblon, Spivak, McClelland, Maier & Neustadt, L.L.P.

(57) ABSTRACT

Provided is a porous electrode substrate having high mechanical strength, good handling properties, high thickness precision, little undulation, and adequate gas permeability and conductivity. Also provided is a method for producing a porous electrode substrate at low costs. A porous electrode substrate is produced by joining short carbon fibers (A) via mesh-like of carbon fibers (B) having an average diameter of 4 μm or smaller. Further provided are a membrane-electrode assembly and a polymer electrolyte fuel cell that use this porous electrode membrane. A porous electrode substrate is obtained by subjecting a precursor sheet, in which short carbon fibers (A) and short carbon fiber precursors (b) having an average diameter of 5 μm or smaller have been dispersed, to carbonization treatment after optional hot press forming and optional oxidization treatment.

20 Claims, 1 Drawing Sheet

50μm

(51) Int. Cl.
*H01M 8/02* (2006.01)
*D04H 1/4242* (2012.01)
*D04H 1/4382* (2012.01)
*D21H 13/50* (2006.01)
*H01B 1/12* (2006.01)
*H01M 4/92* (2006.01)
*H01M 8/10* (2006.01)
*D21H 15/02* (2006.01)

(56) References Cited

U.S. PATENT DOCUMENTS

| | | |
|---|---|---|
| 2007/0166524 A1 | 7/2007 | Nakamura et al. |
| 2007/0218346 A1 | 9/2007 | Ji et al. |
| 2008/0038589 A1 | 2/2008 | Nakamura et al. |
| 2008/0070095 A1 | 3/2008 | Sugi et al. |
| 2008/0268297 A1 | 10/2008 | Quayle et al. |
| 2011/0294036 A1 | 12/2011 | Sumioka et al. |
| 2012/0100456 A1 | 4/2012 | Sumioka et al. |
| 2012/0115063 A1 | 5/2012 | Sumioka et al. |
| 2012/0141911 A1 | 6/2012 | Sumioka et al. |

FOREIGN PATENT DOCUMENTS

| | | |
|---|---|---|
| JP | 63 222078 | 9/1988 |
| JP | 6 123050 | 5/1994 |
| JP | 2002 270191 | 9/2002 |
| JP | 2006 4858 | 1/2006 |
| JP | 2006 40885 | 2/2006 |
| JP | 2006 40886 | 2/2006 |
| JP | 2007 273466 | 10/2007 |
| JP | 2008 503043 | 1/2008 |
| WO | 01 56103 | 8/2001 |
| WO | 02 42534 | 5/2002 |
| WO | 2006 003950 | 1/2006 |

OTHER PUBLICATIONS

Extended European Search Report issued Aug. 27, 2012 in Patent Application No. 10738496.8.

Office Action issued May 16, 2013 in European Patent Application No. 10 738 496.8.

"CFF Acrylic Pulps/Fibrillated Fibers for Wet-Laid/Slurry Processes" Engineered Fibers Technology, XP055062092, Jan. 29, 2005, 5 pages.

U.S. Appl. No. 13/980,774, filed Jul. 19, 2013, Sumioka, et al.

* cited by examiner

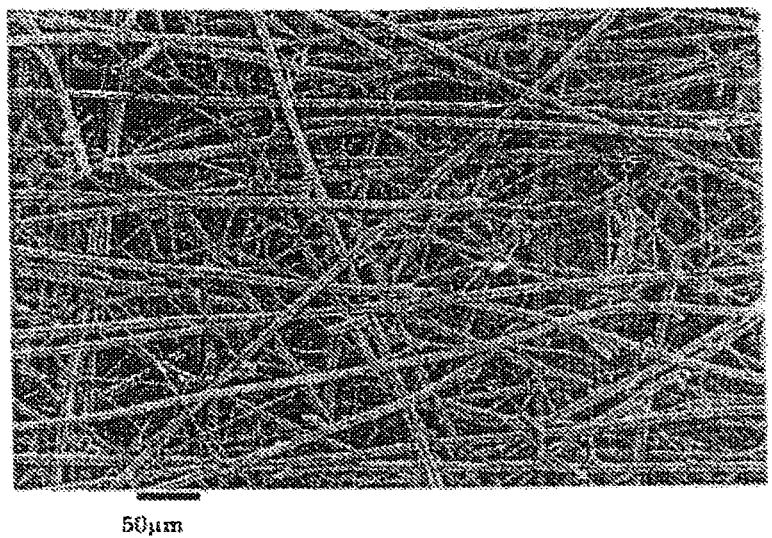

POROUS ELECTRODE SUBSTRATE, METHOD FOR PRODUCING THE SAME, MEMBRANE ELECTRODE ASSEMBLY, AND POLYMER ELECTROLYTE FUEL CELL

CROSS REFERENCE TO RELATED APPLICATION(S)

This application is a divisional of U.S. application Ser. No. 13/147,814 filed on Aug. 4, 2011, the entire content of which is incorporated herein by reference.

TECHNICAL FIELD

The present invention relates to a porous electrode substrate used in a polymer electrolyte fuel cell using a gas fuel and a liquid fuel, a membrane electrode assembly using the same, and a polymer electrolyte fuel cell.

BACKGROUND ART

Polymer electrolyte fuel cells are characterized by using a protonic conductive polymer electrolyte membrane, and are devices that provide an electromotive force by electrochemically reacting a fuel gas such as hydrogen with an oxidizing gas such as oxygen. The polymer electrolyte fuel cells can be utilized as private power generators and power generators for mobile bodies such as automobiles.

Such a polymer electrolyte fuel cell has a polymer electrolyte membrane which selectively conducts hydrogen ions (protons). The fuel cell has two sets of gas diffusion electrodes and has a structure as described below. The gas diffusion electrode has a catalyst layer which contains, as a main component, a carbon powder which supports a noble metal-based catalyst, and has a gas diffusion electrode substrate. Each of the gas diffusion electrodes is joined to the surface of a polymer electrolyte membrane with the catalyst layer facing inward.

An assembly composed of such a polymer electrolyte membrane and two sets of such gas diffusion electrodes is referred to as a membrane electrode assembly (MEA). On both outer sides of the MEA, separators are installed in which gas flow paths are formed in order to feed a fuel gas and an oxidizing gas and to discharge produced gases and excessive gases.

A gas diffusion electrode substrate needs mechanical strength because the gas diffusion electrode substrate is fastened by a load of several megapascals by a separator in order to reduce the electric contact resistance and suppress the leakage of a fuel gas or an oxidizing gas fed from the separator to the outside a fuel cell.

Since a gas diffusion electrode substrate needs to mainly have the following three functions, the gas diffusion electrode substrate is usually a porous electrode substrate having a porous structure. A first function required for the gas diffusion electrode substrate is the function of uniformly feeding a fuel gas or an oxidizing gas, from a gas flow path formed in a separator which is arranged outer side of the gas diffusion electrode substrate, to a noble metal-based catalyst in a catalyst layer. A second function is a function of discharging water produced by a reaction in the catalyst layer. A third function is a function of conducting electrons necessary for a reaction in the catalyst layer or electrons produced by a reaction in the catalyst layer to the separator. What is considered to be an effective way to realize these functions is to employ a gas diffusion electrode substrate that generally uses a carbonaceous material.

Conventionally, in order to increase mechanical strength of the substrate, short carbon fibers were formed to a paper and bound one another by using organic polymers, and then this paper is firing at a high temperature to carbonize the organic polymers and to produce a porous electrode substrate which is composed of carbon/carbon composites in paper shape. However, the production process is complicated and a problem thereof is high cost. Although, in order to reduce the cost, a porous electrode substrate is proposed which is obtained by forming a paper from oxidized short fibers, and thereafter firing the paper at a high temperature to carbonize the oxidized short fibers, since the oxidized short fibers shrink during firing, problems of the electrode substrate are the dimensional stability thereof and a large undulation (the state of the sheet cross-section being waved or the state of that being warped).

Patent Literature 1 discloses a porous carbon electrode substrate for a fuel cell having features that include a thickness of 0.05 to 0.5 mm and a bulk density of 0.3 to 0.8 $g/cm^3$, and a bending strength of 10 MPa or higher and a deflection in bending of 1.5 mm or more in a 3-point bending test under the conditions of a strain rate of 10 mm/min, a distance between fulcrums of 2 cm and a test piece width of 1 cm. However, although the porous electrode substrate exhibits high mechanical strength, small undulation, sufficient gas permeability and sufficient electroconductivity, the problem thereof is high production cost.

Patent Literature 2 discloses a carbon fiber sheet having a thickness of 0.15 to 1.0 mm, a bulk density of 0.15 to 0.45 $g/cm^3$, a carbon fiber content of 95% by mass or more, a compression deformation ratio of 10 to 35%, an electric resistivity of 6 mΩ or lower, and a degree of drape of 5 to 70 g. Although this method for producing the carbon fiber sheet can be at a low cost, since shrinkage during firing is large, problems that occur in the resulting porous electrode substrate include a large unevenness in the thickness and large undulation.

Patent Literature 3 discloses a porous electrode substrate which is obtained by carbonizing a sheet composed of carbon fibers and acrylic pulp fibers. Although the porous electrode substrate can be produced at a low cost, since there is little entanglement between the carbon fibers and the acrylic pulp fibers during the process of forming the sheet, handling the porous electrode substrate is difficult. Comparing the acrylic pulp fibers with common fibrous materials, since the polymer exhibits almost no molecular orientation, the carbonization ratio during carbonization is low; thus in order to raise the handleability, much of the acrylic pulp fiber needs to be added.

CITATION LIST

Patent Literature

Patent Literature 1: WO 2002/042534
Patent Literature 2: WO 2001/056103
Patent Literature 3: JP2007-273466A

SUMMARY OF INVENTION

Technical Problem

The present invention overcomes the above-mentioned problems, and provides a porous electrode substrate which exhibits little breakage during pressurization, good handleability, high thickness precision and small undulation, and which has a sufficient gas permeability and a sufficient electroconductivity, and a method for producing a porous electrode substrate at a low production cost.

Solution to Problem

The present inventors have found that the above-mentioned problems can be solved by the following inventions [1] to [6].
[1] A porous electrode substrate obtained by joining short carbon fibers (A) via mesh-like carbon fibers (B) having an average diameter of 4 μm or smaller.
[2] A method for producing a porous electrode substrate, including a step (1) of producing a precursor sheet containing short carbon fibers (A) and short carbon fiber precursors (b) having an average diameter of 5 μm or smaller dispersed therein, and a step (2) of subjecting the precursor sheet to carbonization treatment at a temperature of 1,000° C. or higher.
[3] The method for producing a porous electrode substrate according to the above [2], wherein the method includes a step (3) of subjecting the precursor sheet to hot press forming at a temperature of lower than 200° C. between the step (1) and the step (2).
[4] The method for producing a porous electrode substrate according to the above [3], wherein the method includes a step (4) of subjecting the precursor sheet, which has been subjected to hot press forming, to oxidization treatment at a temperature between 200° C. or higher and lower than 300° C. between the step (3) and the step (2).
[5] A membrane electrode assembly using a porous electrode substrate according to the above [1].
[6] A polymer electrolyte fuel cell using a membrane electrode assembly according to the above [5].

Advantageous Effects of Invention

The porous electrode substrate according to the present invention exhibits little breakage during compression, good handleability and small undulation, and has a sufficient gas permeability and a sufficient electroconductivity. The method for producing a porous electrode substrate according to the present invention is at low cost because it does not need a resin-binding step.

BRIEF DESCRIPTION OF DRAWINGS

FIG. 1 is a scanning electron microscopic photograph of a surface of the porous electrode substrate according to the present invention.

DESCRIPTION OF EMBODIMENTS

The porous electrode substrate according to the present invention can take the shape of a sheet, a spiral or the like. The basis weight of the porous electrode substrate in the shape of a sheet is preferably about 15 to 100 g/m². The thickness is preferably about 50 to 300 μm. The gas permeability is preferably about 500 ml/hr/cm²/mmAq or higher. The through-plane electric resistance (electric resistance in the thickness direction) is preferably 50 mΩ·cm² or lower. Here, the measurement methods of the gas permeability and the through-plane electric resistance will be described later.

Short carbon fibers (A) constituting a porous electrode substrate are dispersed planarly. "Being dispersed planarly" means that short carbon fibers (A) are present parallel or nearly parallel to the surface of a sheet-shaped electrode substrate. Since the short carbon fibers (A) are dispersed in such a manner, a short circuit due to the short carbon fibers (A) and the breakage of the short carbon fibers (A) can be prevented. The short carbon fibers (A) in a plane may be substantially randomly orientated, or may be orientated highly in a specific direction. The short carbon fibers (A) are present with a linear shape held in a porous electrode substrate. In a porous electrode substrate, the short carbon fibers (A) are not directly bonded, but joined via mesh-like carbon fibers (B)

The short carbon fibers (A) constituting a porous electrode substrate include carbon fibers obtained by cutting carbon fibers, such as a polyacrylonitrile-based carbon fiber (hereinafter, referred to as "PAN-based carbon fiber" in some cases), a pitch-based carbon fiber and a rayon-based carbon fiber, into a suitable length. The fiber length is preferably about 2 to 12 mm from the viewpoint of dispersibility. A PAN-based carbon fiber is preferable from the viewpoint of mechanical strength of a porous electrode substrate. The diameter of a short carbon fiber (A) is preferably 3 to 9 μm from the viewpoint of production cost and dispersibility of the short carbon fiber. The diameter is more preferably 4 μm or larger and 8 μm or smaller from the viewpoint of lessening the undulation of a porous electrode substrate.

The mesh-like carbon fibers (B) having an average diameter of 4 μm or lower are ones in which a mesh-like structure was formed by the fusion of short carbon fiber precursors (b) (described later, hereinafter, referred to as fibers (b) in some cases) having an average diameter of 5 μm or lower, at portions of fibers (b) that came into contact with each other and that came into contact with short carbon fibers (A) in a precursor sheet (described later), and then the fibers (b) shrank. The shape of the mesh-like carbon fibers (B) which connect one joining portion of the mesh of the mesh-like carbon fibers (B) with another joining portion, adjacent to the first joining portion, of the mesh of the mesh-like carbon fibers (B) or with still another joining portion, adjacent to the first joining portion at the short carbon fibers (A), is nearly linear. The mesh-like carbon fibers (B) are present in a bent state or a curved state at joining portions with the short carbon fibers (A). If a porous electrode substrate is taken as 100% by mass, the mesh-like carbon fibers (B) are more preferably 25% by mass or more and 60% by mass or less in order to maintain the mechanical strength of the porous electrode substrate at a sufficient strength.

The porous electrode substrate according to the present invention can be produced, for example, by the above-mentioned methods.

That is, a first production method is a method sequentially carrying out step (1) of producing a precursor sheet containing short carbon fibers (A) and short carbon fiber precursors (b) having an average diameter of 5 μm or smaller dispersed therein, and step (2) of subjecting the precursor sheet to carbonization treatment at a temperature of 1,000° C. or higher. A second production method is a method for sequentially carrying out step (1), step (3) of subjecting the precursor sheet to hot press forming at a temperature of lower than 200° C., and step (2). A third production method is a method for sequentially carrying out step (1), step (3), step (4) of subjecting the precursor sheet which has been subjected to the hot press forming to oxidization treatment at a temperature between 200° C. or higher and lower than 300° C., and step (2).

The fiber (b) is one obtained by cutting a long carbon fiber precursor into a suitable length. The fiber length of the fiber (b) is preferably about 2 to 20 mm from the viewpoint of dispersibility. The cross-sectional shape of fiber (b) is not especially limited, but is preferably of a high roundness from the viewpoint of mechanical strength after carbonization and production cost. The diameter of the fiber (b) is preferably 5 µm or lower in order to suppress breakage due to shrinkage during carbonization. With the diameter of 5 µm or lower, many of the joining points with the short carbon fibers (A) after carbonization can be secured, which is preferable.

Such a fiber (b) includes a polyacrylonitrile-based short carbon fiber precursor (hereinafter, referred to as "PAN-based short carbon fiber precursor" in some cases), a cellulose-based short carbon fiber precursor, and a phenol-based short carbon fiber precursor. The PAN-based short carbon fiber precursor is preferable taking into consideration that it can be joined with the short carbon fibers (A) in a range from a low temperature to a high temperature, and the remaining mass after carbonization is large. The proportion of the fibers (b) remaining as mesh-like carbon fibers (B) finally obtained varies depending on the kind of the fibers (b), the mixing ratio with the short carbon fibers (A), and the presence/absence of oxidization treatment at 200° C. or higher and 300° C. or less. The amount of the fibers (b) that are used based on 100 parts by mass of the short carbon fibers (A) is preferably about 50 to 300 parts by mass.

Applicable production methods of a precursor sheet are paper making methods including a wet method in which short carbon fibers (A) and fibers (b) are dispersed in a liquid medium, and subjected to paper making, and a dry method in which short carbon fibers (A) and fibers (b) are dispersed in air, and made to fall and accumulate, but the wet method is preferable. It is preferable that a proper amount of fibers (b) be used in order to facilitate the dispersion of short carbon fibers (A) as single fibers and also to prevent the dispersed single fibers from reconverging, and that as required, an organic polymer compound be used as a binder and then the mixture of these materials be subjected to a wet paper making.

A method for mixing short carbon fibers (A), fibers (b) and organic polymer compounds includes a method of stirring and dispersing these materials in water, and a method of directly mixing these materials, but is preferably a method of stirring and dispersing these materials in water in order to disperse these materials homogeneously. By mixing short carbon fibers (A) and fibers (b), and further optionally organic polymer compounds as required, and forming a paper from them to produce a precursor sheet, the strength of the precursor sheet is improved, and exfoliation of the short carbon fibers (A) from the precursor sheet and a change in the orientation of the short carbon fibers (A) during production can be prevented.

A precursor sheet can be produced by either a continuous method or a batch method, but is preferably produced by a continuous method from the viewpoint of productivity and mechanical strength of the precursor sheet.

The basis weight of a precursor sheet is preferably about 10 to 200 g/m². The thickness thereof is preferably about 20 to 200 µm.

The organic polymer compound functions as a binder (pasting agent) to tie each component in a precursor sheet containing short carbon fibers (A) and fibers (b). Organic polymer compounds that can be used are a polyvinyl alcohol (PVA), a polyvinyl acetate and the like. Polyvinyl alcohol, in particular, is preferable because it has excellent binding power characteristics during the paper making process and because there is little fall-off of the short carbon fibers. In the present invention, an organic polymer compound may be used by forming it into a fiber shape.

A precursor sheet may be subjected to carbonization treatment, as is, or may be subjected to carbonization treatment after being subjected to hot press forming. After hot press forming and followed by oxidization treatment, a precursor sheet may also be subjected to carbonization treatment. Short carbon fibers (A) are joined by melting fibers (b) and mesh-like carbon fibers (B) having an average diameter of 4 µm or lower are produced by carbonizing the fibers (b). Thereby, a porous electrode substrate can be developed so that it has mechanical strength and electroconductivity. Carbonization treatment is preferably carried out in an inert gas in order to increase the electroconductivity of a porous electrode substrate. Carbonization treatment is usually carried out at a temperature of 1,000° C. or higher. Subjecting a precursor sheet to carbonization treatment in the temperature range of 1,000 to 3,000° C. is preferable, and a temperature range of 1,000 to 2,200° C. is more preferable. If the carbonization treatment temperature is too low, the electroconductivity of a porous electrode substrate becomes insufficient. Before carbonization treatment, a pre-treatment of firing in an inert atmosphere at about 300 to 800° C. can be carried out. The duration of carbonization treatment is, for example, about 10 minutes to 1 hour.

In the case where a precursor sheet continuously produced is subjected to carbonization treatment, the carbonization treatment is preferably carried out continuously over the entire length of the precursor sheet from the viewpoint of reducing production costs. If a porous electrode substrate has a long length, since productivity of the porous electrode substrate is increased, and a MEA production thereafter can be carried out continuously, the production cost of a fuel cell can be greatly reduced. A porous electrode substrate is preferably rolled up continuously from the viewpoint of productivity and reduction of the production cost of the porous electrode substrate and a fuel cell.

A precursor sheet is preferably subjected to hot press forming at a temperature of lower than 200° C. before carbonization treatment from the viewpoint that short carbon fibers (A) and fibers (b) are joined by melting fibers (b) and unevenness in the thickness of a porous electrode substrate is reduced. Any technology can be applied to the hot press forming as long as the technology is capable of applying a uniform hot press forming process to the precursor sheet. For example, the technology includes a method in which flat and smooth rigid plates are abutted on both surfaces of a precursor sheet, and thermally pressed, and a method using a continuous belt press apparatus.

Taking into consideration the production of a long porous electrode substrate, in the case where a precursor sheet that is continuously produced is subjected to hot press forming, the method using a continuous belt press apparatus is preferable. If a porous electrode substrate has a long length, since productivity of the porous electrode substrate is increased, and a MEA production thereafter can be carried out continuously, reduction of the production costs of a fuel cell can be achieved. Taking into consideration productivity and reduction of the production costs of the porous electrode substrate and the fuel cell, the long porous electrode substrate is preferably rolled up continuously. The press method in the continuous belt press apparatus involves a method in which pressure is applied as a line pressure on a belt with a roll press, and a method in which the belt is pressed by using surface pressure with a liquid-pressure head press, but the latter is preferable from the viewpoint of being capable of providing a more flat and smooth porous electrode substrate.

The heating temperature during hot press forming is preferably lower than 200° C., and more preferably 120 to 190° C., in order to effectively make the surface of a precursor sheet flat and smooth. The forming pressure is not especially limited, but in the case where the content ratio of fibers (b) in a precursor sheet is high, the surface of the precursor sheet can be made flat and smooth easily even if the forming pressure is low. At this time, if the pressing pressure is made higher than necessary, problems that can occur include that short carbon fibers (A) break during hot press forming and the structure of a porous electrode substrate is too dense. The forming pressure is preferably about 20 kPa to about 10 MPa. The duration of the hot press forming can be made to last, for example, from 30 seconds to 10 minutes. When a precursor sheet is subjected to hot press forming by being interposed between two sheets of rigid plates or with a continuous belt press apparatus, it is preferable that a release agent be previously applied and that mold-releasing paper be interposed between the precursor sheet and the rigid plate or the belt so that the fibers (b) or the like do not adhere to the rigid plate or the belt.

A precursor sheet is preferably subjected to oxidation treatment at a temperature between 200° C. or higher and lower than 300° C. after being subjected to hot press forming, from the viewpoint of satisfactorily joining short carbon fibers (A) and fibers (b) by melting fibers (b), and improving the carbonization ratio of fibers (b). Oxidization treatment is more preferably carried out at 240 to 270° C. Continuous oxidization treatment by pressurizing and direct heating by using a heating porous plate, or continuous oxidization treatment by an intermittent pressurizing and direct heating by using a heating roll or the like is preferable from the viewpoint of low cost and of being capable of satisfactorily joining short carbon fibers (A) and fibers (b) by melting fibers (b). The duration of oxidization treatment can be made to last, for example, from 1 minute to 2 hours. In the case where a precursor sheet that is continuously produced is subjected to oxidization treatment, the oxidization treatment is preferably carried out continuously over the entire length of the precursor sheet. Thereby, carbonization treatment can be carried out continuously, and productivity of a porous electrode substrate, a MEA and a fuel cell can be improved and production costs can be reduced.

The porous electrode substrate according to the present invention can suitably be used for a membrane electrode assembly. A membrane electrode assembly using the porous electrode substrate according to the present invention can suitably be used for a polymer electrolyte fuel cell.

EXAMPLES

Hereinafter, the present invention will be described more specifically with reference to Examples. Physical properties and the like in Examples were measured by the following methods. "Parts" means "parts by mass."
(1) Gas Permeability
According to JIS P-8117, the time taken for 200 mL of air to permeate a porous electrode substrate was measured using a Gurley Densometer, and the gas permeability (ml/hr/cm²/mmAq) was calculated.
(2) Thickness
The thickness of a porous electrode substrate was measured using a thickness measuring device, Dial Thickness Gauge (trade name: 7321, made by Mitsutoyo Co., Ltd.). The size of the gauge head was 10 mm in diameter, and the measurement pressure was set at 1.5 kPa.
(3) Through-Plane Electric Resistance
The electric resistance (through-plane electric resistance) in the thickness direction of a porous electrode substrate was determined from the following expression by interposing the porous electrode substrate between gold-plated copper plates, pressurizing the copper plates from above and below at 1 MPa, and measuring the resistance value when current was allowed to flow at a current density of 10 mA/cm².

A through-plane electric resistance (mΩ·cm²)=a measured resistance value (mΩ)×a sample area (cm²)
(4) Average Diameter of Mesh-Like Carbon Fibers (B)
The diameters of arbitrary 50 points of mesh-like carbon fibers (B) were measured from scanning electron microscopic photographs of the surface of a porous electrode substrate, and the average diameter was calculated from the measurement.
(5) Content of Mesh-Like Carbon Fibers (B)
The content of mesh-like carbon fibers (B) was calculated by the following expression from the basis weight of a porous electrode substrate that was obtained and from the basis weight of short carbon fibers (A) that were used.

A content of mesh-like carbon fibers (B) (%)=[a basis weight of a porous electrode substrate (g/m²)−a basis weight of short carbon fibers (A) (g/m²)]/the basis weight of the porous electrode substrate (g/m²)×100
(6) Undulation of a Porous Electrode Substrate
The undulation of a porous electrode substrate was calculated from the difference between the maximum value and the minimum value of heights of the porous electrode substrate when the porous electrode substrate having a length of 250 mm and having a width of 250 mm was left at rest on a flat plate.
(7) Handleability of a Porous Electrode Substrate
When a porous electrode substrate was handled, if the shape thereof could be maintained (when a porous electrode substrate was held up, there occurred no smashing, no fracturing, no breaking, no tearing and otherwise), the handleability was considered good. By contrast, if smashing, fracturing, breaking, tearing and the like occurred, the handleability was considered bad.

Example 1

As short carbon fibers (A), PAN-based carbon fibers having an average fiber diameter of 7 μm and an average fiber length of 3 mm were prepared. As short carbon fiber precursors (b) having an average diameter of 5 μm or lower, acrylic short fibers having an average fiber diameter of 4 μm and an average fiber length of 3 mm (trade name: D122, made by Mitsubishi Rayon Co., Ltd.) were prepared. Further as an organic polymer compound, polyvinyl alcohol (PVA) short fibers having an average fiber length of 3 mm (trade name: VBP105-1, made by Kuraray Co., Ltd.) were prepared.

At first, 100 parts of the short carbon fibers (A) were dispersed in water. When the short carbon fibers (A) were sufficiently and homogeneously dispersed, 83 parts of the acrylic short fibers and 53 parts of the PVA short fibers were added into the suspension and were homogeneously dispersed. Then, the dispersion liquid was manually spread in a planar shape to form a paper (having a length of 250 mm and having a width of 250 mm) by using a standard square sheet machine (trade name: No. 2555, made by Kumagai Riki Kogyo Co., Ltd.) according to JIS P-8209, and dried to obtain a precursor sheet of 36 g/m² in basis weight. The dispersion condition of the short carbon fibers (A) and the acrylic short fibers was good.

Then, two sheets of the precursor sheet were overlapped; both surfaces thereof were interposed between papers which are coated with a silicone-based die-releasing agent, and the laminate was thereafter subjected to hot press forming for 3 minutes under the conditions of 180° C. and 3 MPa by using a batch press apparatus. Then, both surfaces of the precursor sheet were interposed between stainless steel punching plates which are coated with a silicone-based release agent, and thereafter subjected to oxidization treatment for 1 minute under the conditions of 280° C. and 0.5 MPa by using a batch press apparatus. Thereafter, the precursor sheet which has been subjected to oxidization treatment was subjected to carbonization treatment for 1 hour under the condition of 2,000° C. in a nitrogen gas atmosphere in a batch carbonization furnace to obtain a porous electrode substrate.

The porous electrode substrate exhibited almost no in-plane shrinkage during carbonization treatment, exhibited good handleability and small undulation of 2 mm or less, and had good air permeability, thickness and through-plane electric resistance. The average diameter of the mesh-like carbon fibers (B) was 3 μm; and the content thereof was 32% by mass. A scanning electron microscopic photograph of the surface of the porous electrode substrate is shown in FIG. 1. It can be confirmed that the dispersed short carbon fibers (A) were joined via mesh-like carbon fibers (B). The evaluation results are shown in Table 1.

Examples 2 and 3, and 11 to 13

Porous electrode substrates were obtained as in Example 1, except for setting the amounts of the acrylic short fibers and the PVA short fibers that were used and the basis weights of the precursor sheet at values shown in Table 1. The porous electrode substrates exhibited almost no in-plane shrinkage during carbonization treatment, exhibited good handleability and small undulation of 2 mm or less, and had good air permeability, thickness and through-plane electric resistance. The planarly dispersed short carbon fibers (A) were joined via mesh-like carbon fibers (B). The evaluation results are shown in Table 1.

Example 14

A porous electrode substrate was obtained as in Example 1, except for setting the amounts of the acrylic short fibers and the PVA short fibers that were used and the basis weight of the precursor sheet at values shown in Table 1, and subjecting one sheet of the precursor sheet to hot pressure forming. The porous electrode substrate exhibited almost no in-plane shrinkage during carbonization treatment, exhibited good handleability and small undulation of 2 mm or less, and had good air permeability, thickness and through-plane electric resistance. The planarly dispersed short carbon fibers (A) were joined via mesh-like carbon fibers (B). The evaluation results are shown in Table 1.

Example 6

A porous electrode substrate was obtained as in Example 1, except for using acrylic short fibers having an average fiber diameter of 3 μm and an average fiber length of 3 mm (trade name: D125, made by Mitsubishi Rayon Co., Ltd.) as short carbon fiber precursors (b) having an average diameter of 5 μm or lower. The porous electrode substrate exhibited almost no in-plane shrinkage during carbonization treatment, exhibited good handleability and small undulation of 2 mm or less, and had good air permeability, thickness and through-plane electric resistance. The planarly dispersed short carbon fibers (A) were joined via mesh-like carbon fibers (B). The evaluation results are shown in Table 1.

Examples 7, and 15 and 16

Porous electrode substrates were obtained as in Example 6, except for setting the amounts of the acrylic short fibers and the PVA short fibers that were used and the basis weights of the precursor sheet at values shown in Table 1. The porous electrode substrates exhibited almost no in-plane shrinkage during carbonization treatment, exhibited good handleability and small undulation of 2 mm or less, and had good air permeability, thickness and through-plane electric resistance. The planarly dispersed short carbon fibers (A) were joined via mesh-like carbon fibers (B). The evaluation results are shown in Table 1.

Example 8

A porous electrode substrate was obtained as in Example 1, except that no oxidization treatment was carried out. The structure and performance of the porous electrode substrate were good as in Example 1. The evaluation results are shown in Table 1.

Example 9

A porous electrode substrate was obtained as in Example 1, except that no hot press treatment and no oxidization treatment were carried out. The structure and performance of the porous electrode substrate were good as in Example 1. The evaluation results are shown in Table 1.

Example 10

(1) Production of a Membrane Electrode Assembly (MEA)

Two sets of porous electrode substrates obtained in Example 1 were prepared as porous electrode substrates for a cathode and an anode. A laminate was prepared in which a catalyst layer (catalyst layer area: 25 $cm^2$, amounts of Pt deposited: 0.3 $mg/cm^2$), which contained a catalyst-supported carbon (catalyst: Pt, amounts of catalyst supported: 50% by mass), was formed on both surfaces of a perfluorosulfonic acid-based polymer electrolyte membrane (membrane thickness: 30 μm). The laminate was interposed between the porous electrode substrates for a cathode and an anode, and these were joined to obtain a MEA.

(2) Evaluation of Properties of a Fuel Cell of the MEA

The MEA was interposed between two sheets of carbon separators having bellows-like gas flow paths to form a polymer electrolyte fuel cell (unit cell). The current density-voltage properties were measured to evaluate is properties of the fuel cell. A hydrogen gas was used as a fuel gas; and air was used as an oxidizing gas. The temperature of the unit cell was set at 80° C.; the utility factor of the fuel gas, 60%; and, the utility factor of the oxidizing gas, 40%. The humidification of the fuel gas and the oxidizing gas was carried out by passing the gases through bubblers of 80° C., respectively. As a result, the cell voltage of the fuel cell at a current density of 0.8 $A/cm^2$ was 0.639 V; the internal resistance of the cell was 3.3 mΩ, which exhibited good properties.

Comparative Example 1

A porous electrode substrate was obtained as in Example 1, except for not using the acrylic short fibers but 133 parts of the PVA short fibers were used, and the basis weight of the precursor sheet was set at 35 $g/m^2$. In the porous electrode substrate, since the PVA was almost not carbonized, the short carbon fibers (A) were not joined and the structure of the sheet shape could not be maintained.

Comparative Example 2

A porous electrode substrate was obtained as in Example 2, except for not using the short carbon fibers (A) but only 100 parts of the acrylic short fibers and 16 parts of the PVA short fibers were used, and the basis weight of the precursor sheet was set at 58 g/m². In the porous electrode substrate, the structure of the sheet shape could not be maintained due to the shrinkage thereof when the acrylic short fibers were carbonized.

Comparative Example 3

A porous electrode substrate was obtained as in Example 1, except for using acrylic short fibers having an average fiber diameter of 10 μm and an average fiber length of 10 mm as the short carbon fiber precursors (b). In the porous electrode substrate, it was observed that the acrylic short fibers were broken at binding portions with the short carbon fibers due to the shrinkage during the carbonization. Additionally, the mesh-like structure was not formed. The through-plane electric resistance exhibited larger resistance than that of the porous electrode substrate in Example 1. The evaluation results are shown in Table 1. In the porous electrode substrate, Although the planarly dispersed short carbon fibers (A) were joined via mesh-like carbon fibers (B), more breakage due to compression exerted during MEA production was observed than in the porous electrode substrate in Example 1. The evaluation results are shown in table 1.

Comparative Examples 6 and 7

Porous electrode substrates were obtained as in Example 6, except for setting the amounts of the acrylic short fibers and the PVA short fibers that were used and the basis weights of the precursor sheet at values shown in Table 1. The porous electrode substrates exhibited almost no in-plane shrinkage during the carbonization treatment, exhibited good handleability and small undulation of 2 mm or less, and had good air permeability, thickness and through-plane electric resistance. Although the planarly dispersed short carbon fibers (A) were joined via mesh-like carbon fibers (B), more breakage due to compression exerted during MEA production was observed than in the porous electrode substrate in Example 6. The evaluation results are shown in table 1.

TABLE 1

| | short carbon fibers (A) (parts by mass) | mean diameter of short carbon fiber precursors (b) (μm) | short carbon fiber precursors (b) (parts by mass) | short PVA fiber (parts by mass) | basis weight of a precursor sheet (g/m²) | mean diameter of mesh-like cabon fibers (B) (μm) | contents of mesh-like cabon fibers (B) (%) | thickness of a porous electrode substrate (μm) | gas permeability (ml/hr/cm²/m mAq) | through-plane electric resistance (mΩ · cm²) |
|---|---|---|---|---|---|---|---|---|---|---|
| Example 1 | 100 | 4 | 83 | 53 | 36 | 3 | 32 | 216 | 2400 | 7.2 |
| Example 2 | 100 | 4 | 250 | 80 | 43 | 3 | 59 | 183 | 2200 | 7.2 |
| Example 3 | 100 | 4 | 100 | 57 | 36 | 3 | 43 | 205 | 2300 | 7.2 |
| Comparative Example 4 | 100 | 4 | 750 | 160 | 51 | 3 | 81 | 116 | 1400 | 3.6 |
| Comparative Example 5 | 100 | 4 | 25 | 40 | 33 | 3 | 11 | 210 | 2900 | 7.6 |
| Example 6 | 100 | 3 | 83 | 53 | 36 | 2.5 | 28 | 205 | 2000 | 6.8 |
| Example 7 | 100 | 3 | 250 | 80 | 43 | 2.5 | 56 | 157 | 1800 | 6.8 |
| Example 8 | 100 | 4 | 83 | 53 | 36 | 3 | 27 | 212 | 2500 | 7.2 |
| Example 9 | 100 | 4 | 83 | 53 | 36 | 3 | 27 | 245 | 3000 | 7.8 |
| Comparative Example 1 | 100 | — | — | 133 | 35 | — | — | — | — | — |
| Comparative Example 2 | — | 4 | 100 | 16 | 58 | — | — | — | — | — |
| Comparative Example 3 | 100 | 10 | 83 | 53 | 36 | — | — | 205 | 3600 | 8.8 |
| Example 11 | 100 | 4 | 250 | 80 | 34 | 3 | 59 | 144 | 2800 | 6.2 |
| Example 12 | 100 | 4 | 250 | 80 | 54 | 3 | 58 | 215 | 1900 | 8.5 |
| Example 13 | 100 | 4 | 80 | 20 | 19 | 3 | 26 | 89 | 5500 | 5.8 |
| Example 14 | 100 | 4 | 250 | 80 | 68 | 3 | 58 | 140 | 2900 | 6.1 |
| Example 15 | 100 | 3 | 250 | 80 | 34 | 2.5 | 57 | 121 | 2500 | 5.9 |
| Example 16 | 100 | 3 | 250 | 80 | 54 | 2.5 | 55 | 180 | 1400 | 7.8 |
| Comparative Example 6 | 100 | 3 | 750 | 160 | 51 | 2.5 | 82 | 117 | 1200 | 3.6 |
| Comparative Example 7 | 100 | 3 | 25 | 40 | 33 | 2.5 | 14 | 215 | 2600 | 7.7 | the fiber diameter of the carbon fibers that originated from the acrylic short fibers was 7 μm, and the content thereof was 26% by mass.

Comparative Examples 4 and 5

Porous electrode substrates were obtained as in Example 1, except for setting the amounts of the acrylic short fibers and the PVA short fibers that were used and the basis weights of the precursor sheet at values shown in Table 1. The porous electrode substrates exhibited almost no in-plane shrinkage during the carbonization treatment, good handleability and small undulation of 2 mm or less, and had good air permeability, thickness and through-plane electric resistance.

The invention claimed is:

1. A porous electrode substrate comprising short carbon fibers which are not directly bonded, but joined via mesh carbon fibers having an average diameter of 4 μm or smaller,
   wherein the mesh carbon fibers are derived from short carbon fiber precursors obtained by cutting long carbon fiber precursors.

2. A membrane electrode assembly comprising a porous electrode substrate according to claim 1.

3. A polymer electrolyte fuel cell comprising a membrane electrode assembly according to claim 2.

4. The porous electrode substrate of claim 1, wherein the porous electrode substrate has a shape of a sheet or a spiral.

5. The porous electrode substrate of claim 4, wherein the porous electrode substrate has a shape of a sheet.

6. The porous electrode substrate of claim 5, wherein a basis weight of the porous electrode substrate is from 15 to 100 g/m$^2$.

7. The porous electrode substrate of claim 1, wherein a thickness of the porous electrode substrate is from 50 to 300 μm.

8. The porous electrode substrate of claim 1, wherein a gas permeability is 500 ml/hr/cm$^2$/mmAq or higher.

9. The porous electrode substrate of claim 1, wherein an electric resistance in a thickness direction is 50 mΩ·cm$^2$ or lower.

10. The porous electrode substrate of claim 1, wherein the short carbon fibers are dispersed planarly.

11. The porous electrode substrate of claim 1, wherein the short carbon fibers have a linear shape.

12. The porous electrode substrate of claim 1, wherein the short carbon fibers comprise carbon fibers obtained by a method comprising cutting carbon fibers into a suitable length.

13. The porous electrode substrate of claim 12, wherein the carbon fibers are at least one selected from the group consisting of a polyacrylonitrile-based carbon fiber, a pitch-based carbon fiber and a rayon-based carbon fiber.

14. The porous electrode substrate of claim 12, wherein the length of the short carbon fibers is from 2 to 12 mm.

15. The porous electrode of claim 12, wherein the carbon fiber is a polyacrylonitrile-based carbon fiber.

16. The porous electrode substrate of claim 1, wherein a diameter of the short carbon fiber is from 3 to 9 μm.

17. The porous electrode substrate of claim 1, wherein a diameter of the short carbon fiber is from 4 to 8 μm.

18. The porous electrode of claim 1, wherein a shape of the mesh carbon fibers is linear.

19. The porous electrode substrate of claim 1, wherein the mesh carbon fibers are in a bent state or a curved state at a joining portion with the short carbon fibers.

20. The porous electrode substrate of claim 1, wherein based on 100% by mass of the porous electrode substrate, the mesh carbon fibers are from 25% to 60% by mass.

* * * * *